Oct. 20, 1931.  F. SUCHOFSKY  1,828,161
WING BRAKE FOR AEROPLANES
Filed Jan. 12, 1931   4 Sheets-Sheet 1

Inventor
Frank Suchofsky.

By Bryant & Lowry
Attorneys

Oct. 20, 1931. F. SUCHOFSKY 1,828,161
WING BRAKE FOR AEROPLANES
Filed Jan. 12, 1931 4 Sheets-Sheet 2
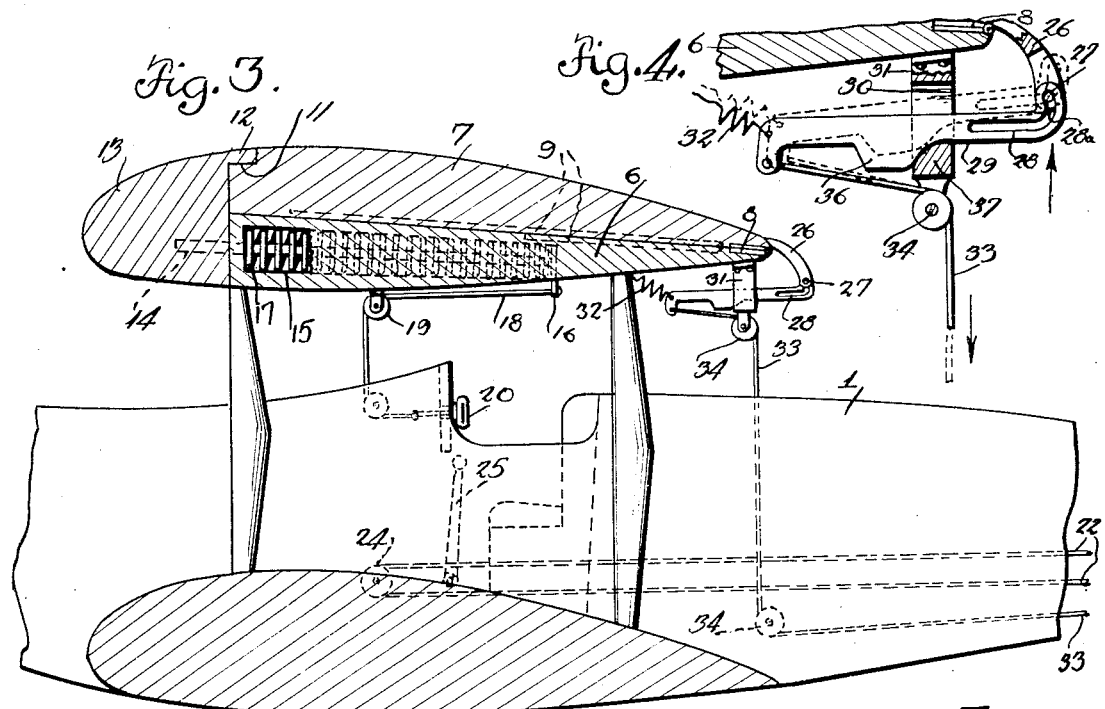
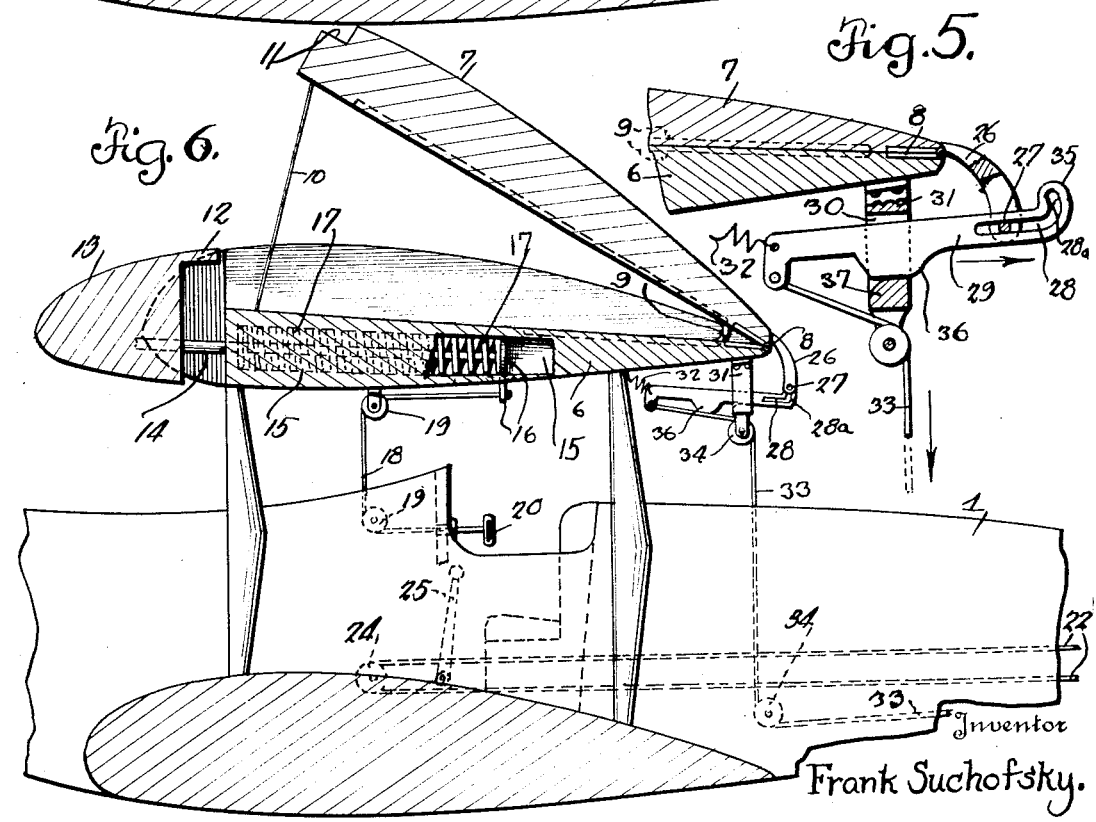

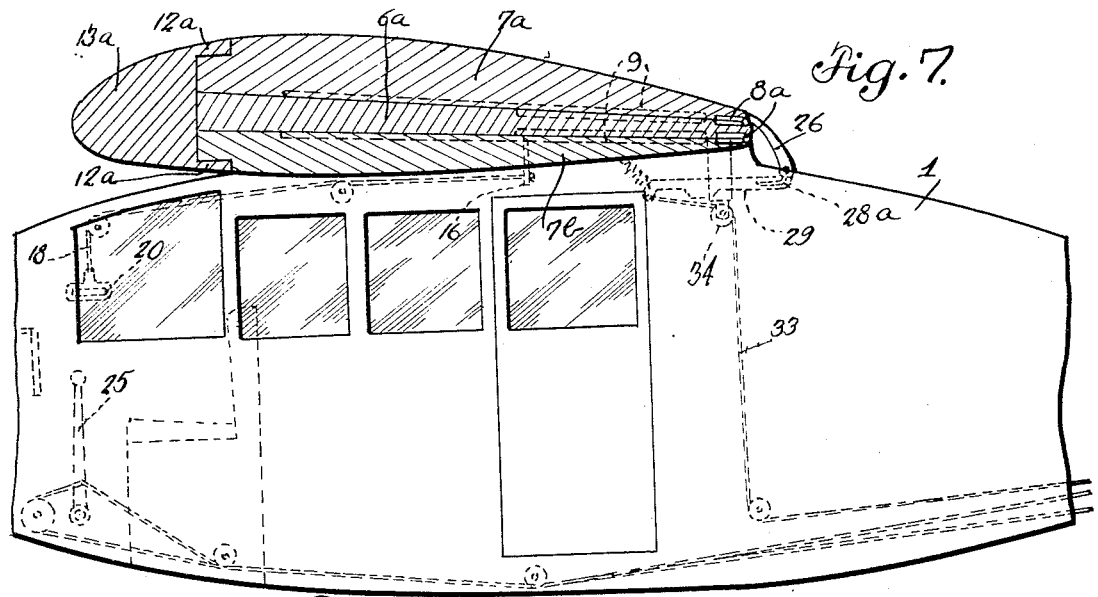
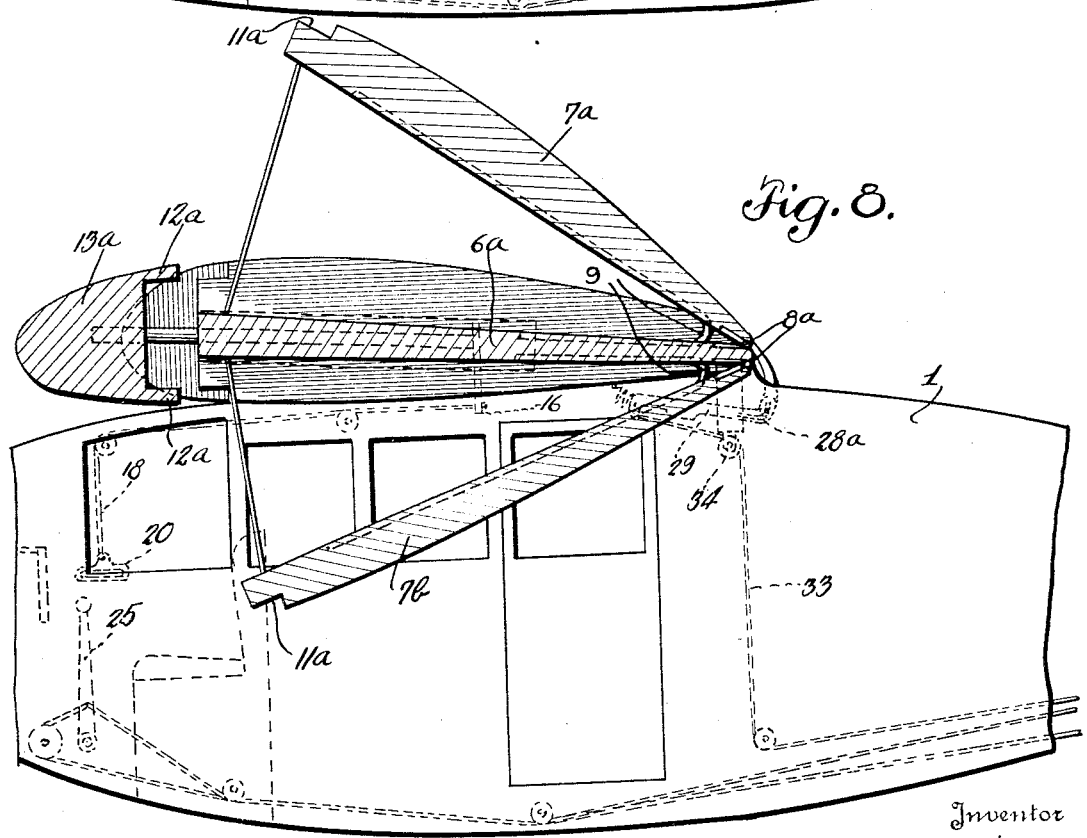

Oct. 20, 1931.  F. SUCHOFSKY  1,828,161
WING BRAKE FOR AEROPLANES
Filed Jan. 12, 1931  4 Sheets-Sheet 4

Inventor
Frank Suchofsky
By Bryant & Lowry
Attorneys

Patented Oct. 20, 1931

1,828,161

UNITED STATES PATENT OFFICE

FRANK SUCHOFSKY, OF HOBOKEN, NEW JERSEY

WING BRAKE FOR AEROPLANES

Application filed January 12, 1931. Serial No. 508,145.

This invention relates to certain new and useful improvements in wing brakes for aeroplanes.

The primary object of the invention is to provide a wing brake for an aeroplane wherein the wing is provided with upper hinged sections normally retained in the stream line contour of the wing and adapted to be manually released for automatic upward swinging movement to act as a brake during landing of an aeroplane to resist forward movement thereof and to bring the aeroplane to a position of rest in an easy and efficient manner.

A further object of the invention is to provide a wing brake for aeroplanes that is operatively associated with the elevator at the rear end of the fuselage, whereby the wing and elevator may cooperate for reducing the speed of travel and bringing the aeroplane to a quick stop during landing.

It is a further object of the invention to provide a wing structure of the foregoing character wherein brake sections are carried by the upper and lower faces of the wing to be manually controlled in their operation.

With the above and other objects in view that will become apparent as the nature of the invention is better understood, the same consists in the novel form, combination and arrangement of parts hereinafter more fully described, shown in the accompanying drawings and claimed.

In the drawings:—

Figure 3 is a fragmentary longitudinal sectional view taken through the wings showing the manually operable release for the brake member of the wing and the connecting devices between the wing brake member and the elevator;

Figure 4 is a detail sectional view showing the position by dotted lines assumed by the connecting devices when the elevator alone is operated during flight;

Figure 5 is a detail sectional view, similar to Figure 4, showing the connecting devices shifted in one direction of movement under action of the elevator with the wing brake member undisturbed;

Figure 6 is a fragmentary longitudinal sectional view, similar to Figure 3 showing the brake section of the wing raised to operative position;

Figure 7 is a fragmentary longitudinal sectional view of an aeroplane showing another form of the invention in which the wing is equipped with brake members at the upper and lower sides thereof;

Figure 8 is a view similar to Figure 7, wherein both brake members of the wing are opened to operative positions;

Figure 1:
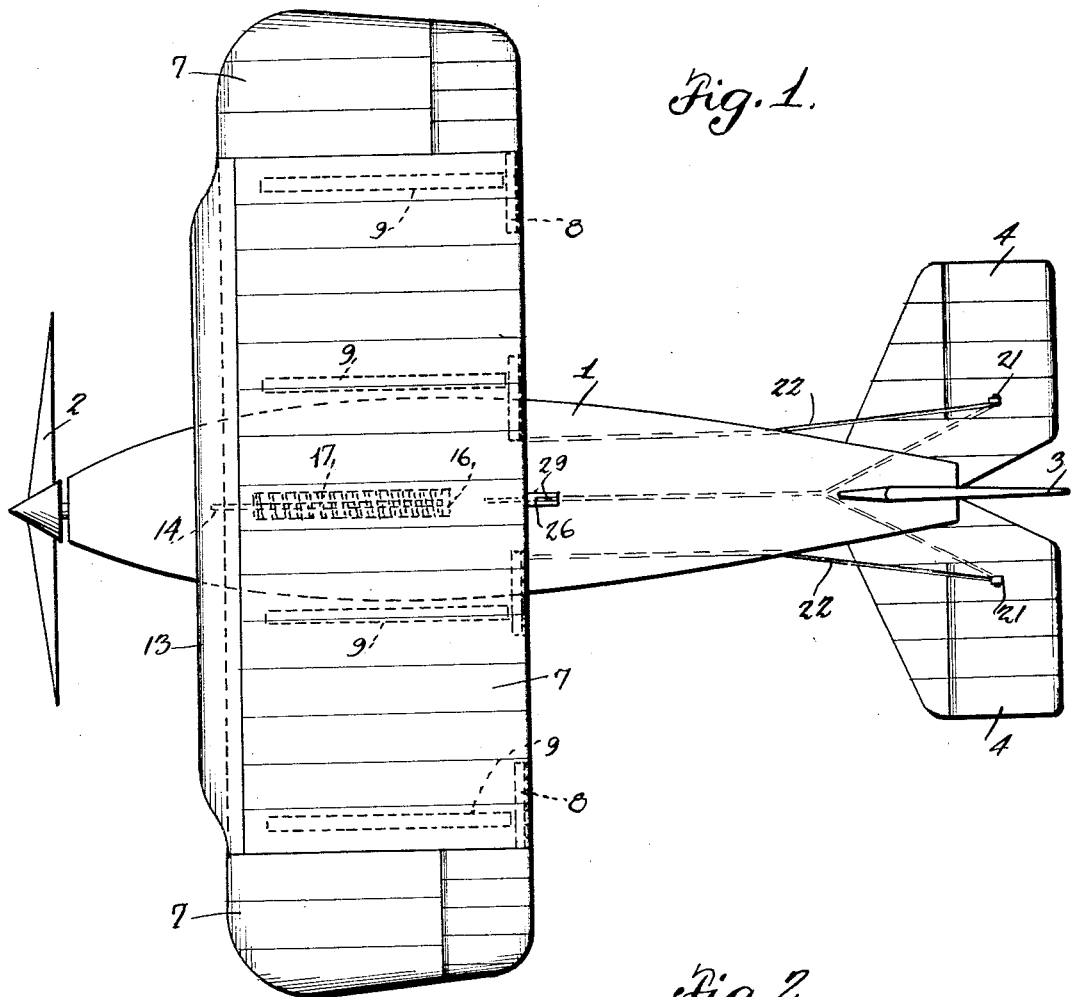
Figure 1 is a top plan view of an aeroplane constructed in accordance with the present invention and equipped with the wing brakes.
Figure 2:
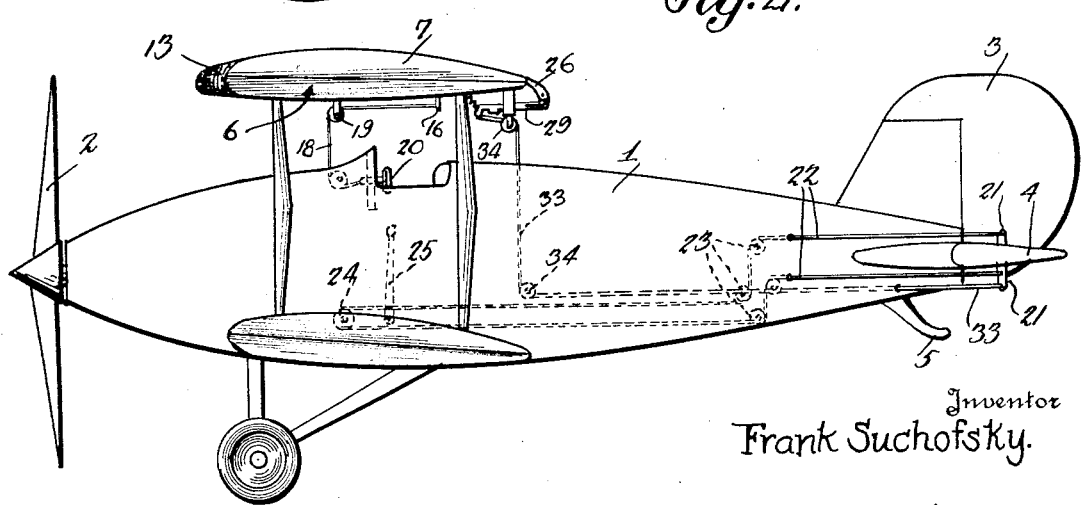
Figure 2 is a side elevational view of the aeroplane showing the brake section of the wing operatively engaged with the rudder at the rear end of the fuselage.

Referring more in detail to the accompanying drawings, and particularly to Figs. 1 to 6, there is illustrated an aeroplane comprising a fuselage 1 carrying a conventional propeller 2 at its forward end, the empennage at the rear end of the fuselage including the vertical rudder 3, an elevator 4 and a landing skid 5.

A bi-plane is illustrated in Figs. 1 to 6, the brake devices being associated with the upper wing 6. The upper wing 6 carries an upper section 7, hinged at the rear edge to the wing 6 as at 8 and a plurality of leaf springs 9 interposed between the wing 6 and the brake section 7 automatically elevate or raise with the brake section 7 upon its hinge mounting 8, when released, the opening movement of the brake section 7 being limited by the cords 10. The upper forward edge of the brake section 7 is rabbeted as at 11 and into which rabbet or groove the flange 12 of the forward edge of the wing or nose 13 extends, as shown in Fig. 3 for retaining the brake section 7 in closed position against the tension of the springs 9, the nose 13 of the wing being forwardly shiftable and carried by rods 14 that extend rearwardly into the pocket 15 provided in the wing 6 and carrying at its inner end an arm 16 depending through a slot in the lower face of the wing 6. A coil spring associated with the rods 11 maintains the nose in retracted position and engaged with the wing brake member 7. The devices for shifting the wing nose 13 to release the wing brake sction 7 includes a cord 18 trained over pulleys 19 with one end attached to the arm 16 and the other end attached to a handle 20 in the cockpit of the fuselage.

Operating devices for the elevator 4 includes upper and lower arms 21 projecting from the elevator 4 and to the ends of which arms a cable 22 is attached, the cable being trained over pulleys 23 and 24 to be operated by the lever 25 arranged in the cockpit of the fuselage. Upon operating the lever 25, the elevator 4 may be raised or lowered to guide the aeroplane in flight in the usual manner.

As shown more clearly in Figures 2 to 6, connecting devices extend between the wing brake section 7 and the elevator 4 and include a curved link 26 projecting outwardly and downwardly of the hinged rear edge of the wing brake section 7 with the lower end thereof bifurcated and provided with a cross pin 27 engageable in the slot 28 formed in the link 29. As shown in Figures 4 and 5, the link 29 extends through an opening 30 in a guide bracket 31 provided therefor that depends from the rear end of the wing 6, the link 29 being tensioned in a forward direction by the springs 32 and being connected to the lower arm 21 of the elevator by the cord 33 passing over guide pulleys 34 as illustrated. The rear end of the link 29 is angularly directed as at 35 and the slot 28 in the link extends into the angle end as at 28a. The normal position of the link 29 is at its limit of forward movement and when so disposed, the pin 27 carried by the arm 26 is located within the slot end 28a of the link. A cam shoulder 36 carried by the underside of the link 29 cooperates with the cam wall 37 upon the guide bracket 31 so that when the elevator 4 is operated by the lever 25, a pull upon the cord 33 will shift the link 29, during which movement the link 29 is elevated by the cam shoulder 36 riding over the cam wall 37 to position the pin 27 in the long run of the slot 28 as shown in Figure 5, the initial movement of the link when the elevator is normally operated, being shown in Figure 4. When the pin 27 is in the upper end of the slot 28a of the link 29, the arm 26 and link are locked against relative movement and upon operating the handle 20 to shift the nose 13 of the wing 6, the brake wing section 7 is illustrated by the springs 9 with the result that the pin 27 bearing against the side wall of the slot 28a moves the link 29 in a forward direction for operating the elevator 4 by a cord connection 33 therewith. It will therefore be seen that when the wing brake section 7 is raised to retard the forward movement of the aeroplane during landing, the elevator 4 is also operated to act as a retarder to the forward progress of the aeroplane. When the wing brake section 7 is raised as shown in Figure 6, the arm 26 moves the link 29 forwardly for the operation of the elevator.

Figure 9:
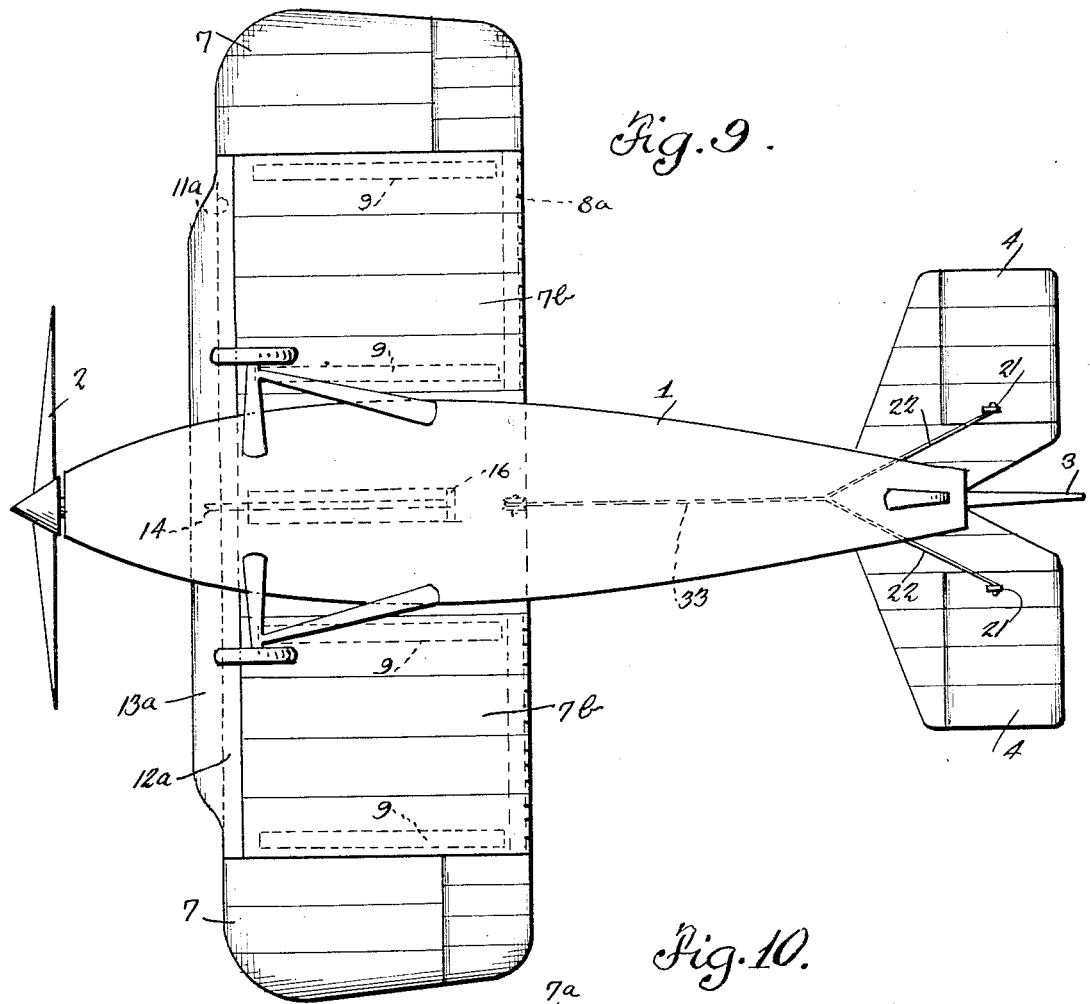
Figure 9 is a bottom plan view of the aeroplane construction shown in Figures 7 and 8, to illustrate the side sections of the wing brake member opening downwardly at each side of the fuselage.
Figure 10:
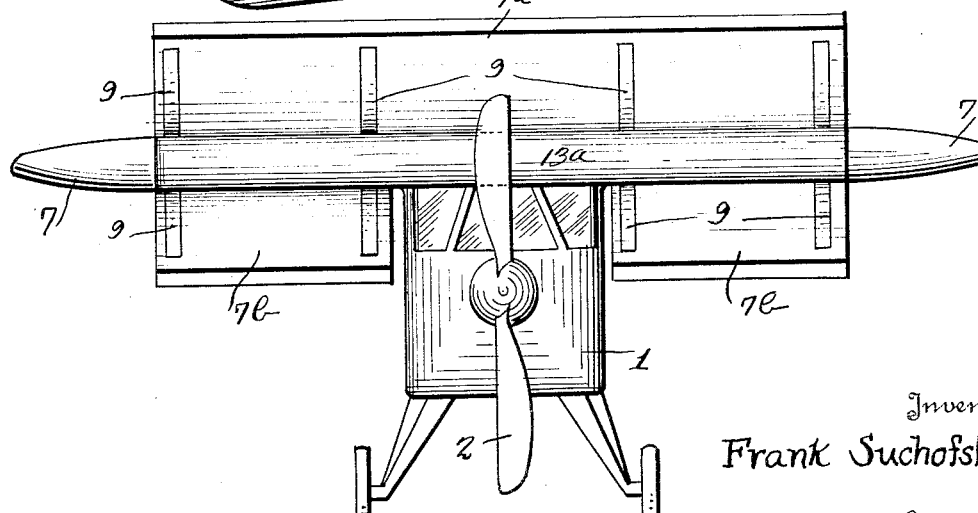
Figure 10 is a front elevational view of the aeroplane shown in Figure 9 with both brake members opened to operative positions.

In the form of the invention shown in Figures 7 to 10, the wing 6a carries wing brake sections 7a and 7b at the upper and lower sides thereof respectively, being hinged thereto as at 8a and operating in a manner similar to the form of invention illustrated in Figures 1 to 6, the nose 13a of the wing 6a carrying inner rear edge flanges 12a for cooperation with the rabbeted edges 11a of the wing brake sections 7a and 7b. As shown in Figures 9 and 10, the lower wing sections 7b are disposed at opposite sides of the fuselage 1, the brake wing sections 7b opening downwardly at opposite sides of the fuselage.

From the above detailed description of the invention, it is believed that the construction and operation thereof will at once be apparent, and while there are herein shown and described the preferred embodiments of the present invention, it is nevertheless to be understood that minor changes may be made therein without departing from the spirit and scope of the invention as claimed.

I claim:—

1. In apparatus of the character described, an aeroplane having a wing and elevator, the wing including a hinged brake section, operating means for the elevator, connections between the wing brake section and elevator permitting operation of the elevator by the operating means therefor without releasing the wing brake section, and means for releasing the brake section with the elevator operated by the connections with the brake action.

2. An aeroplane having a wing and elevator, hinged brake sections carried by the wing, slip-connections between the brake sections and elevator permitting manual operation of the elevator without disturbing the brake sections, and manually operated means for releasing the brake sections and slip connections to simultaneously operate the elevator.

3. In apparatus of the character described, an aeroplane having a wing and elevator, the wing including a hinged brake section, operating means for the elevator, connections between the wing brake section and elevator permitting operation of the elevator by the operating means therefor without releasing the wing brake sections, means for releasing the brake section with the elevator operated by the connections with the brake action, the wing including a rigid section, and a forward shiftable edge for retaining the brake sections in closed position.

4. An aeroplane having a wing and elevator, hinged brake sections carried by the wing, slip-connections between the brake sections and elevator permitting manual operation of the elevator without disturbing the brake sections, manually operated means for releasing the brake sections and slip connections to simultaneously operate the elevator, the wing including a rigid section, and a forward shiftable edge for retaining the brake sections in closed position.

5. In apparatus of the character described, an aeroplane having a wing and elevator, the wing including a hinged brake section, operating means for the elevator, connections between the wing brake section and elevator permitting operation of the elevator by the operating means therefor without releasing the wing brake section, and means for releasing the brake section with the elevator operated by the connections with the brake action, the connections between the wing brake section and elevator including an arm and link locked against relative movements during opening movement of the brake section for operating the elevator.

6. An aeroplane having a wing and elevator, hinged brake section carried by the wing, slip-connections between the brake sections and elevator permitting manual operation of the elevator without disturbing the brake sections, and manually operated means for releasing the brake sections and slip connections to simultaneously operate the elevator, the connections between the wing brake section and elevator including an arm and link locked against relative movement during opening movement of the brake section for operating the elevator.

7. An apparatus of the character described, an aeroplane having a wing and elevator, the wing including a hinged brake section, operating means for the elevator, connections between the wing brake section and elevator permitting operation of the elevator by the operating means therefor without releasing the wing brake sections, means for releasing the brake section with the elevator operated by the connections with the brake action, the wing including a rigid section, and a forward shiftable edge for retaining the brake sections in closed position, the connections between the wing brake section and elevator including an arm and link locked against relative movements during opening movement of the brake section for operating the elevator.

8. An aeroplane having a wing and elevator, hinged brake sections carried by the wing, slip-connections between the brake sections and elevator permitting manual operation of the elevator without disturbing the brake sections, manually operated means for releasing the brake sections and slip connections to simultaneously operate the elevator, the wing including a rigid section, and a forward shiftable edge for retaining the brake sections in closed position, the connections between the wing brake section and elevator including an arm and link locked against relative movements during opening movement of the brake section for operating the elevator.

9. In apparatus of the character described, an aeroplane having a wing and elevator, the wing including a hinged brake section, operating means for the elevator, connections between the wing brake section and elevator permitting operation of the elevator by the operating means therefor without releasing the wing brake section, means for releasing the brake section with the elevator operated by the connections with the brake action, the connections between the wing brake section and elevator including an arm and link locked against relative movement during opening movement of the brake section for operating the elevator, and a pin and slot connection between the arm and link permitting relative movement between the arm and link when the elevator is alone operated.

10. An aeroplane having a wing and elevator, hinged brake sections carried by the wing, slip connections between the brake sections and elevator permitting manual operation of the elevator without disturbing the brake sections, manually operated means for releasing the brake sections and slip connections to simultaneously operate the elevator, the connections between the wing brake section and elevator including an arm and link locked against relative movement during opening movement of the brake section for operating the elevator, and a pin and slot connection between the arm and link permitting relative movement between the arm and link when the elevator is alone operated.

11. An apparatus of the character described, an aeroplane having a wing and elevator, the wing including a hinged brake section, operating means for the elevator, connections between the wing brake section and elevator, permitting operation of the elevator by the operating means therefor without releasing the wing brake sections, means for releasing the brake section with the elevator operated by the connections with the brake action, the wing including a rigid section, a forward shiftable edge for retaining the brake sections in closed position, the connections between the wing brake section and elevator including an arm and link locked against relative movements during opening movement of the brake section for operating the elevator, and a pin and slot connection between the arm and link permitting relative movement between the arm and link when the elevator is alone operated.

12. An aeroplane having a wing and elevator, hinged brake sections carried by the wing, slip-connections between the brake sections and elevator permitting manual operation of the elevator without disturbing the brake sections, manually operated means for releasing the brake sections and slip connections to simultaneously operate the elevator, the wing including a rigid section, a forward shiftable edge for retaining the brake sections in closed position, the connections between the wing brake section and elevator including an arm and link locked against relative movement during opening movement of the brake section for operating the elevator, and a pin and slot connection between the arm and link permitting relative movement between the arm and link when the elevator is alone operated.

13. In apparatus of the character described, an aeroplane having a wing and elevator, the wing including a hinged brake section, operating means for the elevator, connections between the wing brake section and elevator permitting operation of the elevator by the operating means therefor without releasing the wing brake sections, means for releasing the brake section with the elevator operated by the connections with the brake action, the connections between the wing brake section and elevator including an arm and link locked against relative movement during opening movement of the brake section for operating the elevator, a pin and slot connection between the arm and link with the pin normally locked in one end of the slot, and cam devices for shifting the link relative to the arm when the elevator is operated to permit operation of the elevator independently of the brake section.

14. An aeroplane having a wing and elevator, hinged brake sections carried by the wing, slip-connections between the brake sections and elevator permitting manual operation of the elevator without disturbing the brake sections, manually operated means for releasing the brake sections and slip connections to simultaneously operate the elevator, the connections between the wing brake section and elevator including an arm and link locked against relative movement during opening movement of the brake section for operating the elevator, a pin and slot connection between the arm and link with the pin normally locked in one end of the slot, and cam devices for shifting the link relative to the arm when the elevator is operated to permit operation of the elevator independently of the brake section.

15. An apparatus of the character described, an aeroplane having a wing and elevator, the wing including a hinged brake section, operating means for the elevator, connections between the wing brake section and elevator permitting operation of the elevator by the operating means therefor without releasing the wing brake sections, means for releasing the brake section with the elevator operated by the connections with the brake action, the wing including a rigid section, a forward shiftable edge for retaining the brake sections in closed position, the connections between the wing brake section and elevator including an arm and link locked against relative movements during opening movement of the brake section for operating the elevator, a pin and slot connection between the arm and link with the pin normally locked in one end of the slot, and cam devices for shifting the link relative to the arm when the elevator is operated to permit operation of the elevator independently of the brake section.

16. An aeroplane having a wing and elevator, hinged brake sections carried by the wing, slip-connections between the brake sections and elevator permitting manual operation of the elevator without disturbing the brake sections, manually operated means for releasing the brake sections and slip connections to simultaneously operate the elevator, the wing including a rigid section, a forward shiftable edge for retaining the brake sections in closed position, the connections between the wing brake section and elevator including an arm and link locked against relative movement during opening movement of the brake section for operating the elevator, a pin and slot connection between the arm and link with the pin normally locked in one end of the slot, and cam devices for shifting the link relative to the arm when the elevator is operated to permit operation of the elevator independently of the brake section.

17. An aeroplane having a wing and elevator, a wing brake section hinged to the upper side thereof, and connections between the brake section and elevator.

18. An aeroplane having a wing and elevator, wing brake sections hinged to the upper and lower sides thereof, and connections between the brake sections and elevator.

In testimony whereof I affix my signature.
FRANK SUCHOFSKY.